(12) United States Patent  
Hanson et al.

(10) Patent No.: US 6,990,590 B2
(45) Date of Patent: Jan. 24, 2006

(54) STRATEGIC INTERNET PERSONA ASSUMPTION

(75) Inventors: James E. Hanson, Yorktown Heights, NY (US); Sophia Krasikov, Katonah, NY (US); John F. Morar, Mahopac, NY (US); Steve R. White, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 938 days.

(21) Appl. No.: 10/045,836

(22) Filed: Jan. 10, 2002

(65) Prior Publication Data

US 2003/0131260 A1   Jul. 10, 2003

(51) Int. Cl.
*G06F 1/26* (2006.01)
(52) U.S. Cl. .................. 713/194; 713/193; 713/200; 713/201
(58) Field of Classification Search ............... 713/194, 713/193, 200, 201
See application file for complete search history.

(56) References Cited

U.S. PATENT DOCUMENTS 5,963,915 A * 10/1999 Kirsch ..................... 705/26
6,039,624 A *  3/2000 Holmes ................... 455/403
6,167,517 A * 12/2000 Gilchrist et al. ......... 713/186

* cited by examiner

*Primary Examiner*—Thomas R. Peeso
(74) *Attorney, Agent, or Firm*—Duke W. Yee; Gail H. Zarick; Michael R. Nichols

(57) ABSTRACT

A method, computer program product, and data processing system for circumventing profiling and targeting of World Wide Web users is disclosed. A number of fictitious web "personae" are established. A user wishing to perform a particular web transaction assumes a persona that best fits the user's current needs. The user's actions are then attributed to the persona, rather than the user. When the user wishes to perform another transaction, a different persona may be assumed, depending upon the circumstances, so that any disadvantage attributable to performing the same web transaction multiple times may be eliminated. This has the dual advantage of both protecting the user's privacy and taking advantage of special offers and incentives that may be targeted to first-time customers.

45 Claims, 8 Drawing Sheets

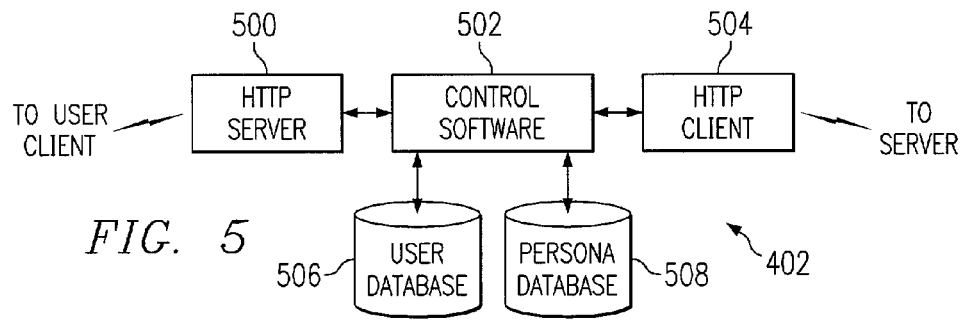
FIG. 5
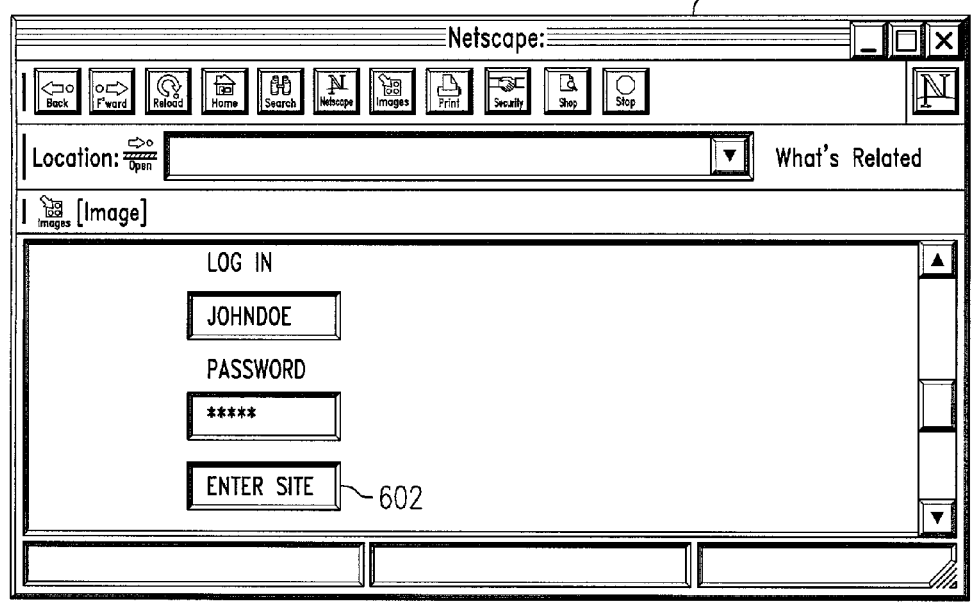
FIG. 6A
FIG. 6B
USER 1
NAME: MICHAEL ELLIOT
ADDRESS: 2000 ANAHEIM DR.
ANYPLACE, TX 77777
CREDIT CARD: 1234 5678 9876 5432
EXP. DATE: 6/03
E-MAIL: me@yahoo.com
USERNAME: MELLIOT
PASSWORD: TEA4TWO
USER 2
NAME: JANE QUINCY
ADDRESS: 3100 SERRANO
NOWHERE, AZ 55555
CREDIT CARD: 3141 5926 6271 8281
EXP. DATE: 3/04
E-MAIL: janeq@hotmail.com
USERNAME: JQ97
PASSWORD: 5NDIME PERSONA 1
NAME : BILL JONES
E-MAIL: bj123@hotmail.com
PURCHASES:
NILE.COM
COOKBOOKS 3
MYSTERIES 5

BONDS AND SOBEL.COM
DICTIONARIES 2
SELF-HELP 1

PERSONA 2
NAME : MARY SMITH
E-MAIL: mary92@juno.com
PURCHASES:
NILE.COM
INVESTMENT 2

BONDS AND SOBEL.COM
COMPUTER 3

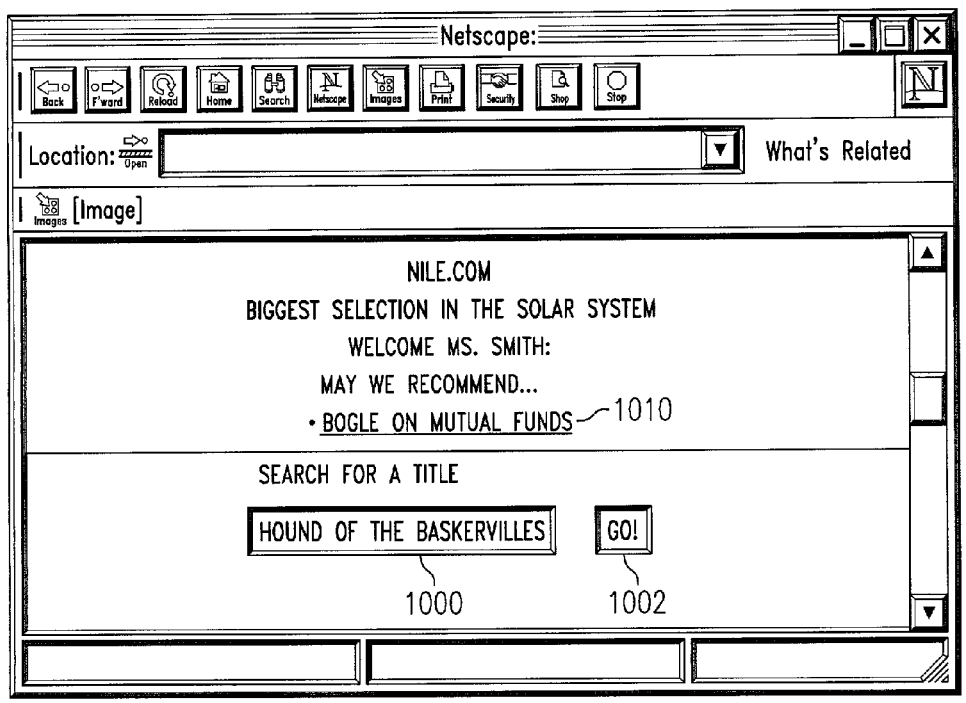

```
<html>
<head>                      1004
<title>NILE.com</title>
</head>
<body bgcolor=#ffffff>
<h1>NILE.com</h1>
<h2>Biggest selection in the Solar System</h2>
<h3>Welcome Ms. Smith</h3>
<p><i>May we recommend</i></p>
<ul>
<li><a href="item?isbn=123456789">Bogle on Mutual Funds</a>
</ul>                       1006
<hr>
<h3>Search for a title</h3>
<form action=srch> ~1008
<input length=40 type=text name=title>
<input type=submit name=go value=Go>
</form>
</body>
</html>
```

FIG. 10C

```
<html>
<head>
<title>NILE.com</title>                1012
</head>
<body bgcolor=#ffffff>
<h1>NILE.com</h1>
<h2>Biggest selection in the Solar System</h2>
<h3>Welcome Ms. Smith</h3>
<p><i>May we recommend</i></p>    1014
<ul>
<li><a href="http://www.personaassumption.com/process?xact=147242">Bogle on Mutual Funds</a>
</ul>                                  1018
<hr>                                   1018
<h3>Search for a title</h3>
<form action="http://www.personaassumption.com/process?xact=131415"method=post>
<input length=40 type=text name=title>             1016
<input type=submit name=go value=Go>
</form>
</body>
</html>
```

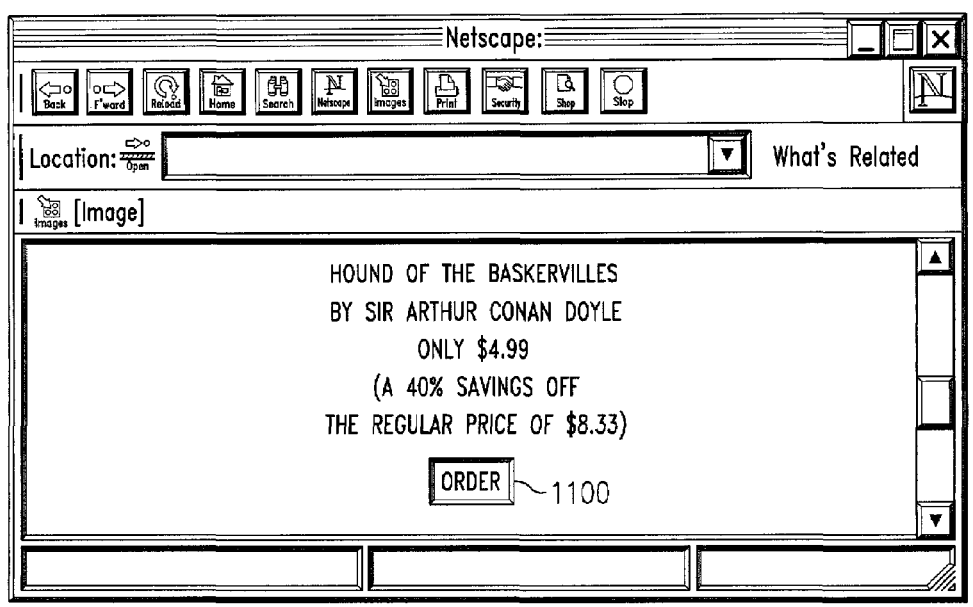

FIG. 11

STRATEGIC INTERNET PERSONA ASSUMPTION

BACKGROUND OF THE INVENTION

1. Technical Field

The present invention is directed toward a method, computer program product, and data processing system for circumventing commercial practices targeted at individual consumers in a large computer network such as the Internet. More specifically, the present invention is directed toward hiding a user's true identity from monitoring and profiling by online organizations such as retailers.

2. Description of Related Art

The Internet, also referred to as an "internetwork", is a set of computer networks, possibly dissimilar, joined together by means of gateways that handle data transfer and the conversion of messages from protocols of the sending network to the protocols used by the receiving network (with packets if necessary). When capitalized, the term "Internet" refers to the collection of networks and gateways that use the TCP/IP suite of protocols.

The Internet has become a cultural fixture as a source of both information and entertainment. Many businesses are creating Internet sites as an integral part of their marketing efforts, informing consumers of the products or services offered by the business or providing other information seeking to engender brand loyalty. Many federal, state, and local government agencies are also employing Internet sites for informational purposes, particularly agencies that must interact with virtually all segments of society such as the Internal Revenue Service and secretaries of state. Providing informational guides and/or searchable databases of online public records may reduce operating costs. Further, the Internet is becoming increasingly popular as a medium for commercial transactions.

Currently, the most commonly employed method of transferring data over the Internet is to employ the World Wide Web environment, also called simply "the Web". Other Internet resources exist for transferring information, such as File Transfer Protocol (FTP) and Gopher, but have not achieved the popularity of the Web. In the Web environment, servers and clients effect data transaction using the Hypertext Transfer Protocol (HTTP), a known protocol for handling the transfer of various data files (e.g., text, still graphic images, audio, motion video, etc.). The information in various data files is formatted for presentation to a user by a standard page description language, the Hypertext Markup Language (HTML). In addition to basic presentation formatting, HTML allows developers to specify "links" to other Web resources identified by a Uniform Resource Locator (URL). A URL is a special syntax identifier defining a communications path to specific information. Each logical block of information accessible to a client, called a "page" or a "Web page", is identified by a URL. The URL provides a universal, consistent method for finding and accessing this information, not necessarily for the user, but mostly for the user's Web "browser". A browser is a program capable of submitting a request for information identified by an identifier, such as, for example, a URL. A user may enter a domain name through a graphical user interface (GUI) for the browser to access a source of content. The domain name is automatically converted to the Internet Protocol (IP) address by a domain name system (DNS), which is a service that translates the symbolic name entered by the user into an IP address by looking up the domain name in a database. The internet also is widely used to transfer applications to users using browsers. With respect to commerce on the Web, individual consumers and business use the Web to purchase various goods and services. In offering goods and services, some companies offer goods and services solely on the Web while others use the Web to extend their reach.

All of this connectivity, however, comes at a price. While information, from businesses for instance, is more accessible to individual users, information about the individual users themselves is easily collected and disseminated. "Cookies" and other mechanisms for "maintaining state" (i.e., preserving a user's identity over a series of web transactions) allow for easy tracking of user's purchase and other habits over time. A "cookie" is a piece of information from a web server that is stored on a user's computer and retrieved by the web server in subsequent transactions so as to preserve the identity of the user across the transactions. One type of cookie, a "persistent cookie," resides on a user's computer even after a web-browsing session has ended. As a user performs web transactions, such as reading particular pages or buying particular products, the web servers serving those transactions watch for the cookies they have placed on the user's computer. Using these cookies, web servers and the organizations that run them can catalog users' transactions to form user profiles, particularly when persistent cookies are used, since persistent cookies can be tracked over a long period of time and across many transactions.

Another way in which a web-based organization tracks users is by requiring a user to "log in" to a site before using it. A user provides a user name and password before accessing the site. Although this is usually a convenience to a repeat user (for instance, a logged-in user need not repeat typing in billing and shipping information to an online retailer), it allows a user's activity to be monitored and profiled.

There are many uses for these profiles. One commonly used tactic is to provide targeted advertising. For instance, if a web site is aware that a user lives in the Dallas-Fort Worth Metroplex, the site can display advertisements for Dallas-Fort Worth-area businesses. While such targeted advertisement seems relatively benign, this kind of profiling can give businesses unfair commercial advantages. If a merchant knows that a customer has a liking for a particular type of product, the merchant will know that the customer will be likely to buy the product at a higher price than other customers. Likewise, if a customer does not normally buy a particular product, a merchant that is aware of this fact can undercut competitors' prices on that item as an enticement to lure that customer into buying the product. All of this can occur without a buyer's even being aware that it is happening.

A need exists, therefore, for a method of circumventing the use of profiling against consumers. A further benefit would arise if such circumvention gave consumers a similar advantage over merchants and other profiling organizations.

SUMMARY OF THE INVENTION

The present invention provides a method, computer program product, and data processing system for circumventing profiling and targeting of World Wide Web users. A number of fictitious web "personae" are established. A user wishing to perform a particular web transaction assumes a persona that best fits the user's current needs. The user's actions are then attributed to the persona, rather than the user. When the user wishes to perform another transaction, a different persona may be assumed, depending upon the circumstances, so that any disadvantage attributable to performing the same web transaction multiple times may be eliminated. This has the dual advantage of both protecting the user's privacy and taking advantage of special offers and incentives that may be targeted to first-time customers.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 5 is a diagram of persona assumption server software in accordance with a preferred embodiment of the present invention;

FIG. 6A is a diagram of a log in page to a persona assumption service in accordance with a preferred embodiment of the present invention;

FIG. 6B is a diagram of a user database in accordance with a preferred embodiment of the present invention;

FIG. 10A is a diagram of an online retailer page viewed with an assumed persona;

FIG. 10B is unmodified HTML source to the page in FIG. 10A;

FIG. 10C is HTML source to the page in FIG. 10A, which has been modified so as to make a persona assumption server act as an intermediary between the user and the online retailer;

FIG. 11 is an order screen showing a discounted price achieved through the use of a false persona in accordance with a preferred embodiment of the present invention;

DETAILED DESCRIPTION OF THE PREFERRED EMBODIMENT

Figure 1:
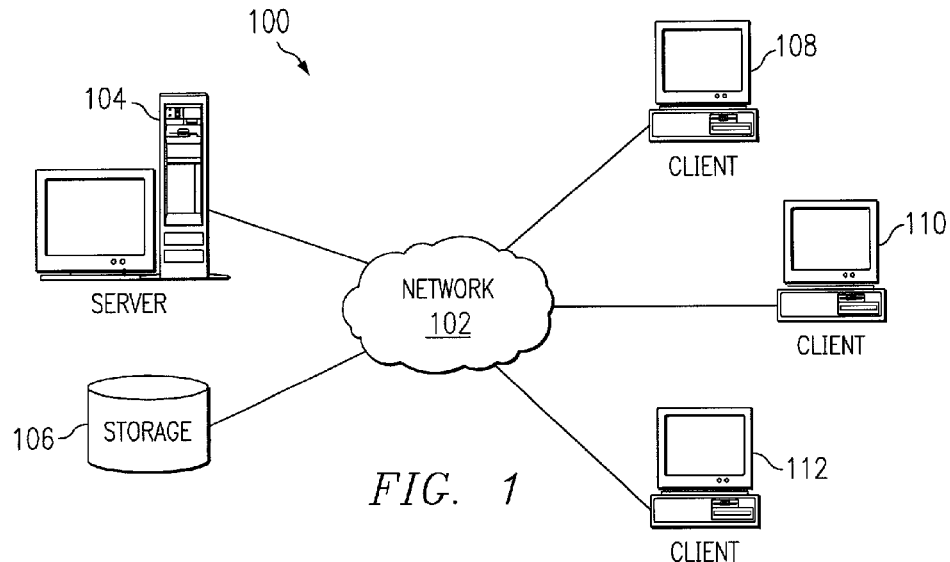
FIG. 1 is a diagram of a computer network in which the processes of the present invention may be implemented.

With reference now to the figures, FIG. 1 is a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, a server 104 is connected to network 102 along with storage unit 106. In addition, clients 108, 110, and 112 also are connected to network 102. These clients 108, 110, and 112 may be, for example, personal computers or network computers. In the depicted example, server 104 provides data, such as boot files, operating system images, and applications to clients 108–112. Clients 108, 110, and 112 are clients to server 104. Network data processing system 100 may include additional servers, clients, and other devices not shown. In the depicted example, network data processing system 100 is the Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
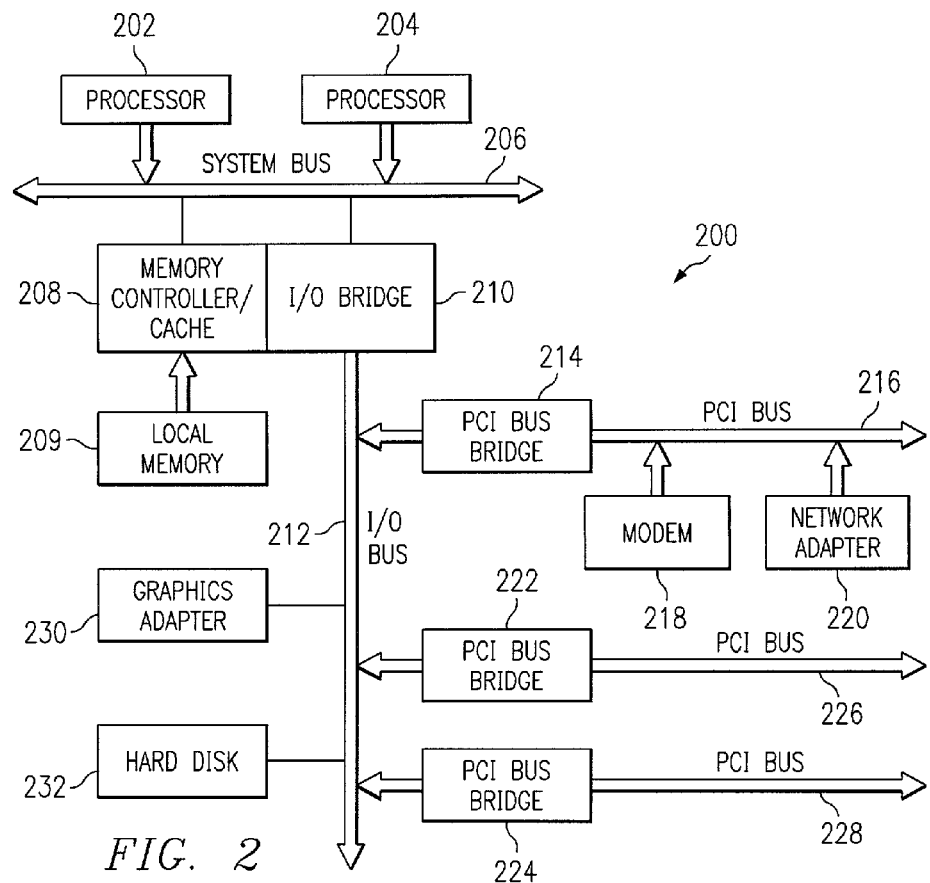
FIG. 2 is a block diagram of a server in which the processes of the present invention may be implemented.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI bus 216. Typical PCI bus implementations will support four PCI expansion slots or add-in connectors. Communications links to network computers 108–112 in FIG. 1 may be provided through modem 218 and network adapter 220 connected to PCI local bus 216 through add-in boards.

Additional PCI bus bridges 222 and 224 provide interfaces for additional PCI buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM RISC/System 6000 system, a product of International Business Machines Corporation in Armonk, N.Y., running the Advanced Interactive Executive (AIX) operating system.

Figure 3:
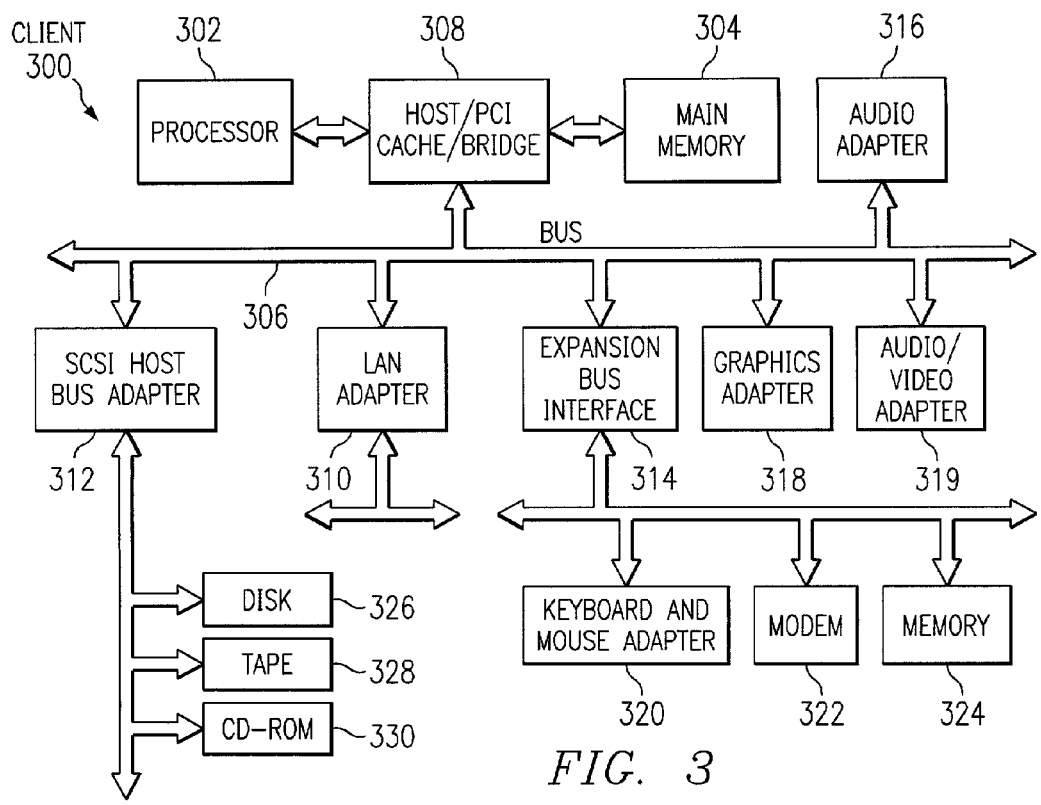
FIG. 3 is a block diagram of a client in which the processes of the present invention may be implemented.

With reference now to FIG. 3, a block diagram illustrating a data processing system is depicted in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows 2000, which is available from Microsoft Corporation. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented operating system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash ROM (or equivalent nonvolatile memory) or optical disk drives and the like, may be used in addition to or in place of the hardware depicted in FIG. 3. Also, the processes of the present invention may be applied to a multiprocessor data processing system.

As another example, data processing system 300 may be a stand-alone system configured to be bootable without relying on some type of network communication interface, whether or not data processing system 300 comprises some type of network communication interface. As a further example, data processing system 300 may be a Personal Digital Assistant (PDA) device, which is configured with ROM and/or flash ROM in order to provide non-volatile memory for storing operating system files and/or user-generated data.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance.

The present invention provides a user with a measure of security and commercial bargaining power by allowing the user to assume a fictitious persona or alter ego when performing web transactions. By the term "user" we mean any entity that makes use of the present invention to assume such a persona; such as, for example, a person, a software agent, a program, a machine, or another fictitious persona. The particular persona is chosen so as to exploit known schemes for targeting online consumers. An illustrative embodiment involving target pricing of customers in an online bookstore is herein described. It is important to realize, however, that the present invention applies with equal utility to other contexts in which the assumption of a false identity may be advantageous to a user. One example of this would be in a communication or transaction between individuals over electronic mail. By assuming a false identity, a user could enter into online transactions without having to reveal personal information, such as the user's actual physical or electronic mail address. Electronic mail could be received by a "persona assumption service," rather than by the user directly. In this way, a persona assumption service could act as an escrow agent, facilitating a transaction, while granting a level of security by using a third party to shield the user from possible malicious conduct (e.g., theft or physical violence).

Figure 4:
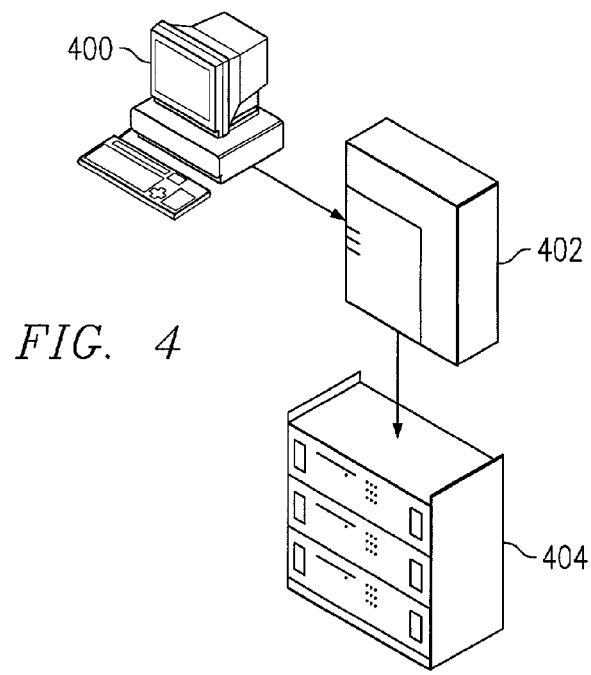
FIG. 4 is a diagram of the process of assuming a false persona in accordance with a preferred embodiment of the present invention.

FIG. 4 is a diagram showing an overall view of the operation of a preferred embodiment of the present invention. A client computer 400 communicates through a persona server 402 with a commercial web server 404. For the purpose of illustrating the invention, web server 404 is associated with an online bookstore that uses targeted pricing. Persona server 402 hides the identity of the user of client computer 400 by the use of cookies and/or logins associated with a false persona. A "false persona," as used in this document, means a false identity of a person, organization, or any other entity capable of engaging in online commercial transactions. A persona should thus be distinguished from, say, a network address assumed by a masquerading router or firewall. Personas identify persons or person-like things. Thus, web server 404 "believes" it is dealing with the person or entity represented by the false persona, rather than the real user of client computer 400. Client computer 400 directs persona server 402 to perform online transactions under the guise of the false persona.

Which false persona is chosen depends on what type of transaction will take place, with which organization it will take place, and what products or services are involved. For instance, if a website charges high prices to customers who show a liking for books in a particular subject, a user could assume a persona that appears to have no interest in that subject, so as to circumvent the targeted pricing scheme. As another example, if a website offers promotions to first-time customers, a user could assume a "newborn" persona with no prior history of transactions with that website so as to take advantage of the offer.

FIG. 5 is a functional block diagram of persona server 402. HTTP server 500 receives transaction requests from a user client and returns information to the user client. Control software 502 associates a user client with a given false persona and translates messages between the user client and a web server so as to replace the user client's true identity with that of the persona. HTTP client 504 communicates with a web server under the guise of the false persona. HTTP client 504 fulfills cookie retrieval requests from the web server by providing the persona's cookie, rather than the user client's cookie. Information sent by HTTP client 504 to the web server has been processed by control software 502 so as to hide the user client's identity and substitute the false persona's identity whenever feasible. Likewise, information read by HTTP client 504 from the web server is processed by control software 502 so as to ensure that the user client will send all of its HTTP requests through HTTP server 500, rather than directly to the web server, so as to preserve anonymity.

Control software 502 has access to two databases. User database 506 stores personal and contact information regarding user clients. Persona database 508 stores information regarding various false personas available for use. Control software 502 associates information about a user client in user database 506 with a persona from persona database 508 to allow a user client to assume a false persona. In the following examples, both user database 506 and persona database 508 are used in facilitating a transaction.

FIGS. 6A–11 provide a representation of the operation of a preferred embodiment of the present invention from the perspective of a web-based user interface. The embodiment depicted in FIGS. 6A–11 is a persona assumption system used in conjunction with online bookstores. One of ordinary skill in the art will appreciate that the processes of the present invention are not limited in scope to the sale of books, or even to sales websites in general. Rather, the present invention can be applied whenever an advantage can be obtained by disguising the user's identity and substituting some kind of fictitious alter ego. FIG. 6A depicts a browser 600 displaying a log-in screen, where a user can enter a username and password and access the persona assumption website by clicking button 602.

FIG. 6B depicts a user database in accordance with a preferred embodiment of the present invention. The user database stores records containing personal information for each user of the persona assumption service, including the username and password of each user.

Figure 7:
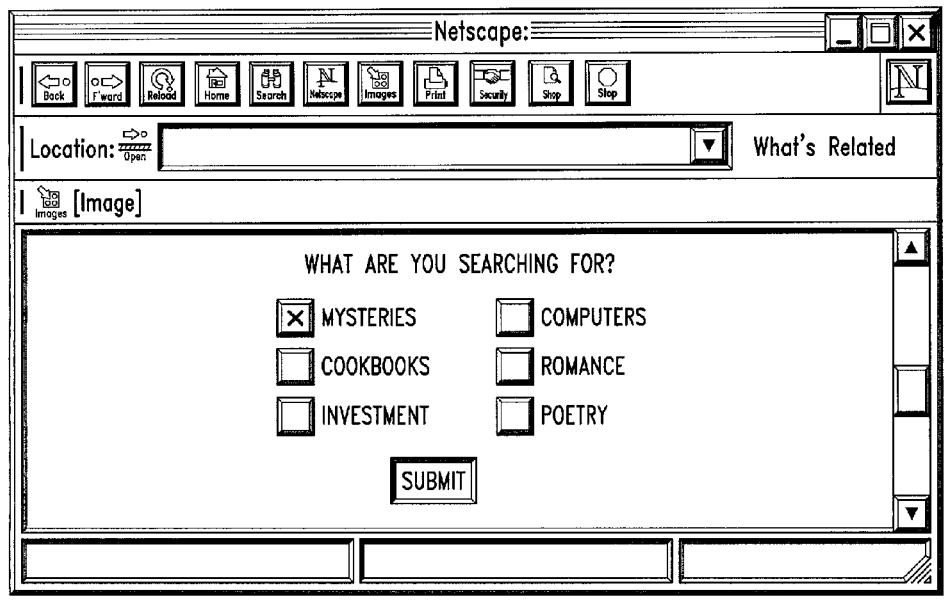
FIG. 7 is a product selection page in accordance with a preferred embodiment of the present invention.
Figure 8:
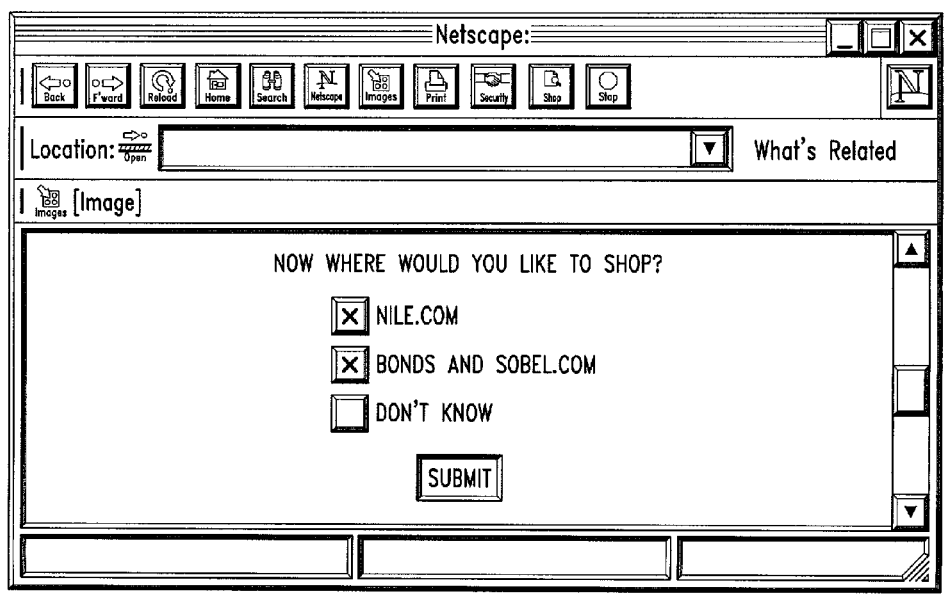
FIG. 8 is merchant selection page in accordance with a preferred embodiment of the present invention.

FIG. 7 depicts a web page for selecting a type of product (in this case, a genre of book). Selecting the type of product to be purchased aids the persona system in choosing a persona that best fits the user's current needs. More specifically, if a user will be charged a premium for products that it is known that the user likes, the user will benefit from assuming a persona that does not appear to have the same liking for those products. Thus, in the example, by selecting "mysteries," the service will attempt to choose a persona that has not purchased mystery books. If no such persona exists, then a new one can be created. FIG. 8 depicts a web page allowing the user to choose stores at which to shop. This also aids in selecting a persona, in that a persona may have purchased a particular type of product at one store but not at another. Also, it may be possible that different stores utilize different targeting practices, and knowing which store(s) will be shopped at helps determine whether the characteristics of a given persona will effectively circumvent or take advantage of merchants' targeting practices.

Figures 9A, 9B:
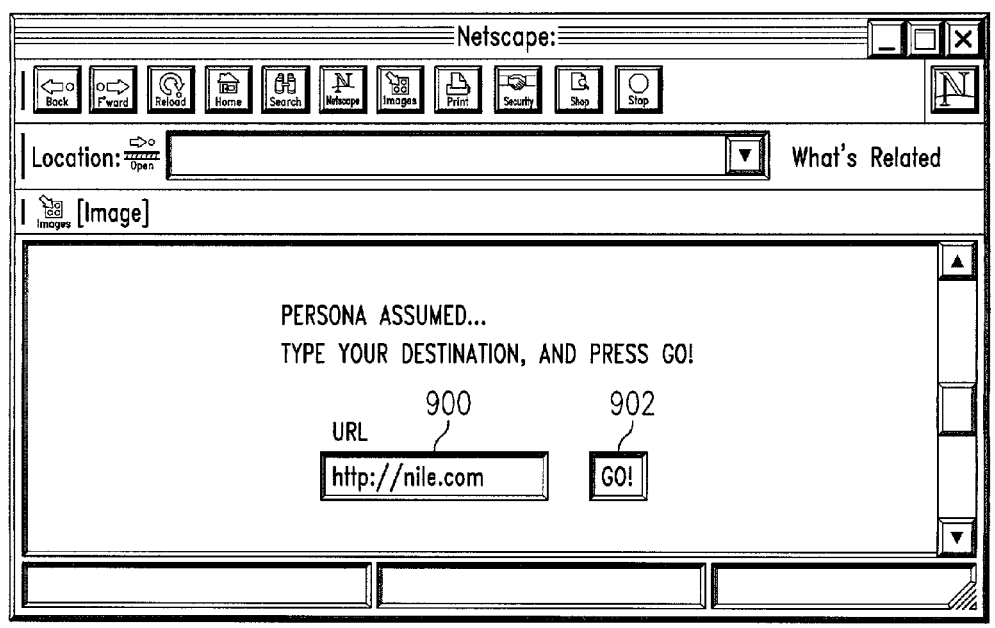
FIG. 9A is a diagram of a persona database in accordance with a preferred embodiment of the present invention.
FIG. 9B is a diagram of a persona assumption confirmation and launch page in accordance with a preferred embodiment of the present invention.

FIG. 9A depicts a persona database in accordance with a preferred embodiment of the present invention. The persona database contains both fictitious personal information regarding the personas and information about products purchased under the guise of each persona in the past. In the diagram, persona 2 has purchased two books on investment from "Nile.com" and three books on computers from "Bonds and Sobel.com." If, as in the running example, a user wishes to buy mystery books and the bookstores engage in targeted pricing, such that an avid mystery reader would pay a premium for mysteries, the user is better off with persona 2, rather than persona 1, since persona 1 has already purchased five mystery books, and persona 2 has not purchased any. Thus, when such targeted pricing occurs, the optimal persona can be chosen by finding the persona that has purchased the least number of the type of product in question from the vendor(s) in question. One of ordinary skill in the art will recognize, however, that under different targeting practices and different environments, different persona selection strategies or algorithms may be employed with comparable results.

FIG. 9A also contains electronic mail (e-mail) addresses for each of the personas. These e-mail addresses may be real addresses operated by the persona service, for receiving order confirmations for forwarding to users. Any "spam" (unsolicited "junk" e-mail) received in the personas' e-mail in-boxes can be discarded before reaching the user.

FIG. 9B depicts a web page showing that a persona has been selected by the service and has now been assumed by the user. The user is now free to enter a destination URL into entry field 900 and press button 902 to proceed to the user's online retailer of choice.

FIG. 10A depicts a web page of an online retailer being visited by a user under a false persona in accordance with a preferred embodiment of the present invention. In the running example, the user wishes to purchase a mystery book. Here, however, because the user has assumed a fictitious persona showing an interest, not in mysteries, but in investment books, the user's is presented a recommendation to purchase a book on investing, "Bogle on Mutual Funds." The user is provided with a text input 1000 and submission button 1002 for searching for a book desired by the user.

The page in FIG. 10A is downloaded from the online retailer's website by HTTP client 504 (in FIG. 5), processed by control program 502, then transmitted to the user's client computer by HTTP server 500. The user's client computer never communicates directly with the retailer's website.

The online retailer believes it is communicating with the persona "Mary Smith," rather than with Michael Elliot, because when the online retailer's web server requests a cookie from the user, HTTP client 504 (in FIG. 5) returns a cookie associated with the persona, not with the actual user.

FIGS. 10B and 10C show how control program 502 processes the HTML pages from the retailer's website so as to ensure that the user never directly accesses the retailer's website. FIG. 10B shows an HTML source listing 1004 for the page depicted in FIG. 10A, as it is downloaded by HTTP client 504 from the retailer's website. Source listing 1004 includes a link tag 1006 and a submission form tag 1008 for initiating additional contacts with the retailer's website. Link tag 1006 generates link 1010 in FIG. 10A, which directs the user to page on the retailer's website offering the book "Bogle on Mutual Funds." Submission form tag 1008 generates the search form made up of text input 1000 and submission button 1002. Link tag 1006 and submission form tag 1008 point to pages on the retailer's website; if source listing 1004 were not modified by control program 502, a user clicking on link 1010 or submission button 1002 would initiate a direct connection with the retailer, thus bypassing the persona assumption service.

For this reason, control program 502 modifies HTML source, such as that in source listing 1004 to make its links and forms point to HTTP server 500, rather than to the retailer directly. FIG. 10C illustrates how this is done in a preferred embodiment. HTML source listing 1012 is a modified version of source listing 1004 generated by control program 502. Link tag 1006, which pointed to the retailer's own website has been replaced with link tag 1014, which points to HTTP server 500, instead. Likewise, submission form tag 1016 replaces submission form tag 1008, and it points to HTTP server 500 as well. These replacement tags carry codes, which are translated by control program 502 back into the original URLs found in tags 1006 and 1008.

FIG. 11 depicts a web page showing the user's desired book at a discounted price. Clicking button 1100 will begin a process of ordering the book.

At the appropriate point in the ordering process, the control program 502 enters shipping and billing data into the seller's form. This process may involve "screen-scraping" the seller's HTML output in order to identify the correct way to supply the information. "Screen-scraping" means analyzing information as it is displayed on a computer screen to extract useful information; for example, if a ZIP code is needed, the information displayed on the computer screen can be scanned to find a five-digit number in the vicinity of the acronym "ZIP." In one embodiment, the control program 502 supplies the persona assumption service's own billing information, such as a credit card owned by the persona assumption service and possibly associated with the persona in use, and then separately bills the user. In an alternative embodiment, the user's credit card data, obtained from the user's entry in user database 506, is supplied directly to the seller. Similarly, the persona assumption service could supply its own shipping information to the seller and then relay the product to the user, or it could supply the user's shipping information directly to the seller.

Figure 12:
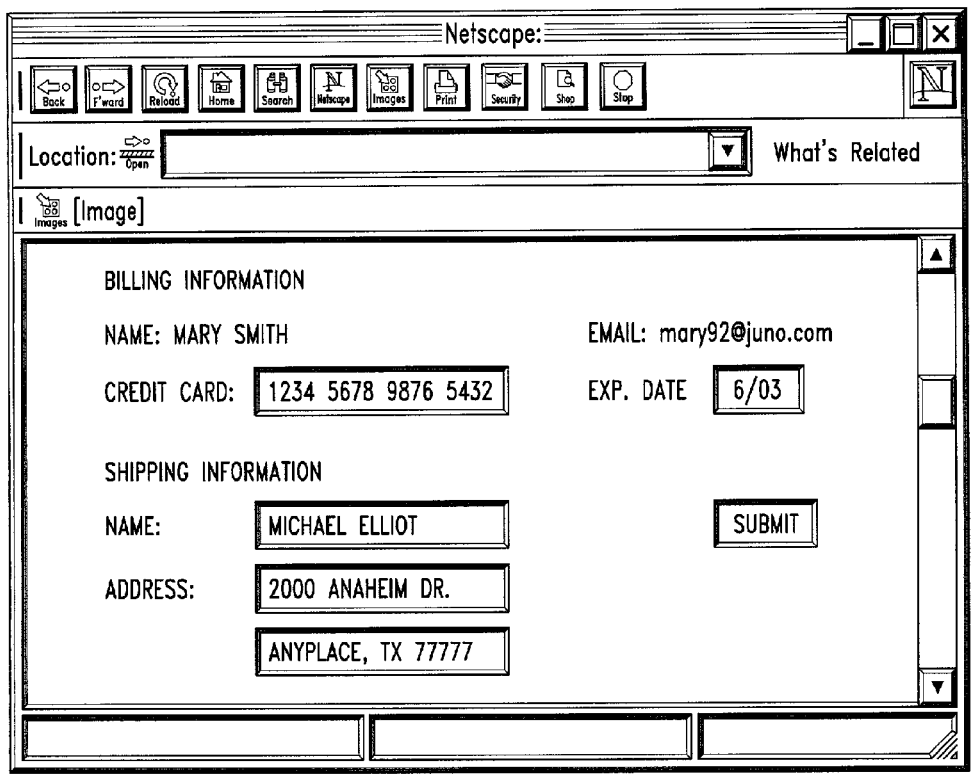
FIG. 12 is a billing information screen to an online retailer, filled with actual billing and shipping information in accordance with a preferred embodiment of the present invention.

FIG. 12 depicts a page representing a portion of an order form for the book being purchased by the user from the previous figures in which the user's credit card information and shipping information have been entered. Note that although the user's personal information is now being sent to the online retailer, it is too late for the online retailer to change the price of the book as offered. Thus, entering this personal data at this late stage is relatively harmless, at least with respect to purchase price.

Figure 13:
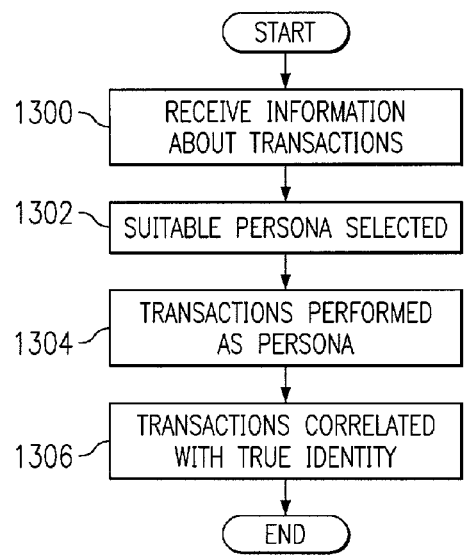
FIG. 13 is a flowchart representation of a process of assuming a false persona in accordance with a preferred embodiment of the present invention.

FIG. 13 is a flowchart representation of the operation of a preferred embodiment of the present invention. First, a user enters information about the transactions the user will be executing online (step 1300). Next, a persona suited to the user's purposes is selected for the user (step 1302). Then, the user performs the transactions under the guise of the fictitious persona (step 1304). Finally, an optional step of correlating the transactions made under the guise of the persona with the user's true identity (e.g., arranging for a product to be shipped or billed to the actual user) is executed (step 1306).

One of ordinary skill in the art will recognize that many variations upon the basic invention as disclosed herein are possible. For instance, the server-based "persona assumption service" might be replaced with a web browser program that allowed for the creation of multiple personas on a user's own client computer. Also, in the case of online services using machine-friendly interfaces, such as eXtensible Markup Language (XML) or Simple Object Access Protocol (SOAP), an embodiment of the present invention could act under the guise of a persona using such an interface and in so doing, provide identity masking to a user transparently. In such a situation, "screen-scraping" the seller's information would be unnecessary, since the seller's XML output would specify the form in which the user's information should be supplied. Another variation would be to allow a user to choose a persona under manual control, such as by selecting from a list of personas, selecting from a categorized list of persona types, or by specifying desired attributes of the persona.

In cases in which the user is a software agent or other non-human entity, the present invention would preferably communicate directly with these non-human users via XML, SOAP, or other machine-friendly interface. In such a situation, no HTTP server or Web browser would be involved.

There are numerous applications for the use of an assumed persona in electronic commerce. For instance, a user may wish to split a large product order into smaller orders, each under a different persona, to hide the fact that the user is making such a large order. A group of users may wish to use a single persona as a means of sharing online services or pooling resources. Also, a persona may be used to play "what if" and experiment with options on a given website, without the experimentation being discovered (e.g., experimenting with an airline reservation system to determine which days are cheaper to fly on).

Other environments than the World Wide Web or online shopping are also amenable to the processes of the present invention. For instance, a persona assumption system could be set up for posting messages to message forums and newsgroups, so as to hide a user's true identity from others that might misuse that information. Also, persona assumption could be used in sending and receiving instant messages (using software such as ICQ or AOL Instant Messenger for sending short text messages in real-time).

A service such as the one herein described will, in a preferred embodiment, be a paid service. A number of billing arrangements are possible, including but not limited to: a flat membership fee for use, collecting a percentage of a consumer's savings realized by using the persona, and billing the user for usage time.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. Although the depicted illustrations show the mechanism of the present invention embodied on a single server, this mechanism may be distributed through multiple data processing systems. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, operable in a data processing system attached to a network, and comprising steps of:
   receiving, from a user, a request to perform a first transaction through the network;
   associating a first false persona with the transaction, wherein the first false persona is selected from a plurality of false personas so as to achieve an advantage for the user with respect to the first transaction; and
   executing the first transaction under the guise of the first false persona so as to avoid revealing the user's identity.

2. The method of claim 1, wherein the first transaction includes purchasing a product, and wherein the product includes one of a good and a service.

3. The method of claim 2, further comprising:
   selecting the first false persona so as to prevent the product's being offered to the user at a price that is targeted at the user.

4. The method of claim 2, further comprising:
   selecting the first false persona so as to encourage the product's being offered to the user at a price that is targeted to the first false persona.

5. The method of claim 1, further comprising:
   receiving an instruction from the user to select the first false persona from the plurality of false personas.

6. The method of claim 1, further comprising:
   associating a second false persona with a second transaction; and
   executing the second transaction under the guise of the second false persona so as to avoid revealing the user's identity and so as to avoid revealing an association between the second transaction and the first transaction.

7. The method of claim 6, wherein the second transaction is related to the first transaction.

8. The method of claim 6, wherein the first transaction includes purchasing a first product and the second transaction includes purchasing a second product, and wherein the first product and the second product each include at least one of a good and a service.

9. The method of claim 8, wherein the first product and the second product are identical products.

10. The method of claim 1, wherein the first transaction includes participating in an online auction.

11. The method of claim 1, wherein the transaction is sending a message.

12. The method of claim 11, wherein the message is one of an electronic mail message, a newsgroup post, a message forum post, and an instant message.

13. The method of claim 1, further comprising:
    receiving a message associated with the false persona; and
    performing a dispositive action with respect to the message, wherein the dispositive action includes at least one of discarding the message and forwarding the message to the user.

14. The method of claim 13, wherein the message is one of an electronic mail message, a newsgroup post, and an instant message.

15. The method of claim 1, wherein the user is one of a plurality of users that are associating with the first false persona.

16. A computer program product in a computer readable medium, comprising instructions for:
    receiving, from a user, a request to perform a first transaction through a network;
    associating a first false persona with the transaction, wherein the first false persona is selected from a plurality of false personas so as to achieve an advantage for the user with respect to the first transaction; and
    executing the first transaction under the guise of the first false persona so as to avoid revealing the user's identity.

17. The computer program product of claim 16, wherein the first transaction includes purchasing a product, and wherein the product includes one of a good and a service.

18. The computer program product of claim 17, comprising additional instructions for:
    selecting the first false persona so as to prevent the product's being offered to the user at a price that is targeted at the user.

19. The computer program product of claim 17, comprising additional instructions for:
    selecting the first false persona so as to encourage the product's being offered to the user at a price that is targeted to the first false persona.

20. The computer program product of claim 16, comprising additional instructions for:
    receiving an instruction from the user to select the first false persona from the plurality of false personas.

21. The computer program product of claim 16, comprising additional instructions for:
    associating a second false persona with a second transaction; and
    executing the second transaction under the guise of the second false persona so as to avoid revealing the user's identity and so as to avoid revealing an association between the second transaction and the first transaction.

22. The computer program product of claim 21, wherein the second transaction is related to the first transaction.

23. The computer program product of claim 21, wherein the first transaction includes purchasing a first product and the second transaction includes purchasing a second product, and wherein the first product and the second product each include at least one of a good and a service.

24. The computer program product of claim 23, wherein the first product and the second product are identical products.

25. The computer program product of claim 16, wherein the first transaction includes participating in an online auction.

26. The computer program product of claim 16, wherein the transaction is sending a message.

27. The computer program product of claim 26, wherein the message is one of an electronic mail message, a newsgroup post, a message forum post, and an instant message.

28. The computer program product of claim 16, comprising additional instructions for:
    receiving a message associated with the false persona; and
    performing a dispositive action with respect to the message, wherein the dispositive action includes at least one of discarding the message and forwarding the message to the user.

29. The computer program product of claim 28, wherein the message is one of an electronic mail message, a newsgroup post, and an instant message.

30. The computer program product of claim 16, wherein the user is one of a plurality of users that are associated with the first false persona.

31. A data processing system comprising:
    a bus system;
    a processing unit connected to the bus system, wherein the processing unit includes at least one processor;

memory connected to the bus system;
a network adapter connected to the bus system, wherein the network adapter connects to a network; and
a set of instructions
wherein the processing unit executes the set of instructions to perform the acts of:
receiving, from a user, a request to perform a first transaction through the network;
associating a first false persona with the transaction, wherein the first false persona is selected from a plurality of false personas so as to achieve an advantage for the user with respect to the first transaction; and
executing the first transaction under the guise of the first false persona so as to avoid revealing the user's identity.

32. The data processing system of claim 31, wherein the first transaction includes purchasing a product, and wherein the product includes one of a good and a service.

33. The data processing system of claim 32, wherein the processing unit executes the set of instructions to perform the additional acts of:
selecting the first false persona so as to prevent the product's being offered to the user at a price that is targeted at the user.

34. The data processing system of claim 32, wherein the processing unit executes the set of instructions to perform the additional acts of:
selecting the first false persona so as to encourage the product's being offered to the user at a price that is targeted to the first false persona.

35. The data processing system of claim 31, wherein the processing unit executes the set of instructions to perform the additional acts of:
receiving an instruction from the user to select the first false persona from the plurality of false personas.

36. The data processing system of claim 31, wherein the processing unit executes the set of instructions to perform the additional acts of:
associating a second false persona with a second transaction; and
executing the second transaction under the guise of the second false persona so as to avoid revealing the user's identity and so as to avoid revealing an association between the second transaction and the first transaction.

37. The data processing system of claim 36, wherein the second transaction is related to the first transaction.

38. The data processing system of claim 36, wherein the first transaction includes purchasing a first product and the second transaction includes purchasing a second product, and wherein the first product and the second product each include at least one of a good and a service.

39. The data processing system of claim 38, wherein the first product and the second product are identical products.

40. The data processing system of claim 31, wherein the first transaction includes participating in an online auction.

41. The data processing system of claim 31, wherein the transaction is sending a message.

42. The data processing system of claim 41, wherein the message is one of an electronic mail message, a newsgroup post, a message forum post, and an instant message.

43. The data processing system of claim 31, wherein the processing unit executes the set of instructions to perform the additional acts of:
receiving a message associated with the false persona; and
performing a dispositive action with respect to the message, wherein the dispositive action includes at least one of discarding the message and forwarding the message to the user.

44. The data processing system of claim 43, wherein the message is one of an electronic mail message, a newsgroup post, and an instant message.

45. The data processing system of claim 31, wherein the user is one of a plurality of users that are associating with the first false persona.

* * * * *